UNITED STATES PATENT OFFICE

ELWYN WALLER AND CHARLES A. SNIFFIN, OF NEW YORK, N. Y.

PROCESS OF MAKING WHITE LEAD.

SPECIFICATION forming part of Letters Patent No. 488,374, dated December 20, 1892.

Application filed February 27, 1892. Serial No. 423,074. (No specimens.)

*To all whom it may concern:*

Be it known that we, ELWYN WALLER and CHARLES A. SNIFFIN, both citizens of the United States, and residents of the city, county, and State of New York, have invented an Improved Process of Making White Lead, of which the following is a specification.

This invention relates to what are known as precipitation processes for producing white lead, as distinguished from corrosion processes.

In the preparation of lead hydro-carbonate, commercially known as the pigment "white lead," one of the processes is known as the "French" or "precipitation" method. It consists in obtaining a solution of basic acetate of lead by some well known method and then passing through this solution under ordinary atmospheric pressure a current of carbon dioxide gas, which effects the precipitation of a portion of the lead in the solution as "white lead." The character of the product obtained by this "French" method is thus described in "*Die Erd-Mineral und Lack Farben, &c., Vierte Auflage*, Weimar, 1881; Dr. Stanislaus Mierzinski," page 75: "One obtains by this method a white lead which, it is true is of a particularly fine white color, but has very little covering power, because the same is of a loose texture, of a coarse grain, and often crystalline."

We have discovered a method of managing this precipitation which affords a product which is highly amorphous in character, and possesses in a marked degree the covering power and body so much desired in white lead when used as a pigment; and which also effects a very material economy in the manufacture of white lead by the precipitation method. This method, which forms the subject of the present application, we will now describe.

We first prepare a solution of basic lead acetate, and then mix it with water, preferably impregnated with carbon dioxide, and then pass into this mixture carbon dioxide gas while under pressure, at the same time agitating the mixture so that the necessary amount of gas may be taken up, and the lead, over and above what the acetic acid will hold in combination under these conditions will be separated and precipitated in the form of lead hydro-carbonate. We have found that a pressure of from eight to ten pounds per square inch in the closed precipitating vessel will suffice for the purpose, but we do not limit ourselves to this range of pressures. We have found that, under ordinary atmospheric pressure, with an open vessel, the other conditions being the same as described, a precipitate of the same quality will be produced, but that the amount of precipitated lead hydro carbonate obtainable under the conditions last named depends largely upon the extent or degree of dilution of the solution of basic acetate, the other conditions remaining the same. Or, in other words, under ordinary atmospheric pressure, the greater the extent of the dilution, the larger will be the percentage of the lead hydro carbonate that can be precipitated by carbon dioxide gas. By employing carbon dioxide, under pressure in the precipitating vessel or tank, the necessity for large dilution is avoided, and the lead acetate solution from which the hydro carbonate has been precipitated, does not require so much fuel to bring it to the state of concentration suitable for use in preparing another portion of basic lead acetate as for example by boiling it with litharge or other substance containing lead.

It will be understood by those familiar with the art that the solution of basic lead acetate to be treated with cabon dioxide, is produced by treating some substance containing lead, as litharge for example with a solution of neutral lead acetate obtained in the process of manufacture from a preceding precipitating operation and the commercial success of the method, from an economical point of view, is dependent on the degree of dilution of this solution of neutral acetate. Hence the importance of the treatment with carbon dioxide under a pressure above that of the atmosphere, as it enables us to obtain, practically, the maximum of precipitated hydro carbonate with the minimum of dilution of the solution.

The mixing of the solution of basic lead acetate with carbonated water which we prefer to employ in order to employ a highly amorphous product, we do not broadly claim herein as such method is embodied in another application filed by us September 5, 1891, bearing the serial number 404,867; but the method described in said application may be employed to special advantage in connection with our present invention, which latter effects an important economy. We may, however employ the carbon dioxide gas under pressure, according to our present invention, in connection with the well known "French" method heretofore described with results that show an improvement in the product as well as in the cost of production.

We have not considered it necessary to show any apparatus for carrying out our invention as such is within the knowledge of any one skilled in the art. We need only say that the precipitating tank or vessel containing the solution of basic acetate, must be closed in order to obtain the requisite pressure therein.

Having thus described our invention, we claim:—

1. The herein described method of making white lead, which consists in subjecting a solution of basic lead acetate with water, in mass, to the action of carbon dioxide gas while said solution is under a pressure above the atmospheric pressure and maintaining said pressure during precipitation of lead from said solution in the form of lead hydrocarbonate.

2. The herein described method of making white lead, which consists in subjecting a solution of basic lead acetate mixed with water impregnated with carbon dioxide, while said mixture is under a pressure above the atmospheric pressure and in mass, to the action of carbon dioxide gas, and maintaining said pressure during precipitation of lead from said solution in the form of lead hydrocarbonate.

3. The herein described method of making white lead, which consists in subjecting a solution of basic lead acetate mixed with water impregnated with carbon dioxide, while said mixture is in mass and under a pressure above the atmospheric pressure, to the action of carbon dioxide gas, and agitating the mixture during the admixture of the gas therewith, said pressure being maintained during precipitation of lead from the solution in the form of lead hydrocarbonate.

In witness whereof we have hereunto signed our names in the presence of two subscribing witnesses.

ELWYN WALLER.
CHAS. A. SNIFFIN.

Witnesses:
HENRY CONNETT,
JOHN D. CAPLINGER.